United States Patent
Kim et al.

(10) Patent No.: US 9,323,375 B2
(45) Date of Patent: Apr. 26, 2016

(54) TOUCH SENSOR INTEGRATED TYPE DISPLAY DEVICE

(71) Applicant: LG Display Co., Ltd., Seoul (KR)

(72) Inventors: Juhan Kim, Gyeonggi-do (KR); Cheolse Kim, Daegu (KR); Jinseong Kim, Gyeonggi-do (KR); Manhyeop Han, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/547,373

(22) Filed: Nov. 19, 2014

(65) Prior Publication Data

US 2015/0153882 A1 Jun. 4, 2015

(30) Foreign Application Priority Data

Dec. 2, 2013 (KR) ........................ 10-2013-0148525

(51) Int. Cl.
*G06F 3/041* (2006.01)
*G06F 3/044* (2006.01)

(52) U.S. Cl.
CPC .............. *G06F 3/0412* (2013.01); *G06F 3/041* (2013.01); *G06F 3/044* (2013.01); *G06F 2203/04103* (2013.01)

(58) Field of Classification Search
None
See application file for complete search history.

(56) References Cited

U.S. PATENT DOCUMENTS

| 7,859,521 B2 | 12/2010 | Hotelling et al. | |
| 2013/0033439 A1* | 2/2013 | Kim | G02F 1/13338 345/173 |
| 2014/0062943 A1* | 3/2014 | Choi | G06F 3/0412 345/174 |
| 2014/0118299 A1* | 5/2014 | Wang | G06F 3/0416 345/174 |
| 2014/0125626 A1* | 5/2014 | Yang | G02F 1/134336 345/174 |
| 2014/0160066 A1 | 6/2014 | Kim et al. | |
| 2014/0176465 A1* | 6/2014 | Ma | G06F 3/041 345/173 |
| 2015/0268762 A1* | 9/2015 | Wang | G06F 3/0412 345/174 |
| 2015/0309644 A1* | 10/2015 | Sun | G06F 3/0412 345/173 |

FOREIGN PATENT DOCUMENTS

| CN | 202838292 U | 3/2013 |
| CN | 103186306 A | 7/2013 |
| CN | 203178998 U | 9/2013 |
| KR | 10-1318448 B1 | 10/2013 |

OTHER PUBLICATIONS

Extended European Search Report dated May 26, 2015, for the European patent application No. 14193419.0.

* cited by examiner

*Primary Examiner* — Ryan A Lubit
(74) *Attorney, Agent, or Firm* — Morgan, Lewis & Bockius LLP

(57) ABSTRACT

A touch sensor integrated type display device includes gate lines and data lines crossing over the gate lines, a plurality of pixel electrodes respectively disposed in areas defined by the crossing of the gate lines and the data lines, a plurality of 1-1 electrodes each of which is disposed correspondingly to some of the pixel electrodes and has a first size, a plurality of 1-2 electrodes connected to the plurality of 1-1 electrodes, each of which is disposed correspondingly to another some of the pixel electrodes, and has a second size greater than the first size, and a plurality of second electrodes, each of which is disposed between the 1-1 and 1-2 electrode and is arranged in a direction crossing the 1-1 and 1-2 electrodes. The two 1-1 electrodes are disposed between the 1-2 electrodes in parallel.

13 Claims, 13 Drawing Sheets

TOUCH SENSOR INTEGRATED TYPE DISPLAY DEVICE

This application claims the benefit of priority under 35 U.S.C. §119(a) to Korean Patent Application No. 10-2013-0148525 filed on Dec. 2, 2013, which is incorporated by reference herein in its entirety.

BACKGROUND OF THE INVENTION

1. Field of the Invention

The present disclosure relates to a display device, and more particularly, to a touch sensor integrated type display device capable of recognizing a user's touch operation.

2. Discussion of the Related Art

In recent years, various input devices, such as a keyboard, a mouse, a joystick, and a digitizer, have been used to allow users to interface with home appliances or information telecommunication devices. However, when the user makes use of these input devices, user's dissatisfaction increases because the user is required to learn how to use the input devices and the input devices occupy space. Therefore, a convenient and simple input device capable of reducing erroneous operations is required. In response to this demand, a touch sensor for enabling the user to input information by directly touching the screen with his or her hand or a pen was suggested.

The touch sensor has a simple configuration capable of reducing the erroneous operations. The user can also perform an input action without using a separate input device and can quickly and easily manipulate a display device through the contents displayed on the screen. Accordingly, the touch sensor has been applied to various display devices.

The touch sensor used in the display devices may be classified into an add-on type touch sensor and an on-cell type touch sensor. The add-on type touch sensor is configured such that a display device and a touch sensor are individually manufactured and then the touch sensor is attached to an upper substrate of the display device. The on-cell type touch sensor is configured such that components constituting a touch sensor are directly formed on the surface of an upper glass substrate of the display device.

There is a problem of an increase in a thickness of the display device because the add-on type touch sensor has a structure in which the touch sensor is mounted on the display device. Further, the visibility of the display device is reduced by a reduction in brightness of the display device resulting from the increase in the thickness of the display device.

On the other hand, the on-cell type touch sensor shares a glass substrate with the display device because the touch sensor has the structure in which the touch sensor is formed on the surface of the glass substrate of the display device. Therefore, a thickness of the display device using the on-cell type touch sensor is less than a thickness of the display device using the add-on type touch sensor. However, the entire thickness of the display device using the on-cell type touch sensor increases because of a touch driving electrode layer, a touch sensing electrode layer, and an insulating layer for insulating the touch driving electrode layer and the touch sensing electrode layer which constitute the on-cell type touch sensor. Further, the number of processes for manufacturing the display device using the on-cell type touch sensor has increased, and thus the manufacturing cost increases.

Accordingly, the need for a touch sensor integrated type display device capable of solving the above-described problems has arisen. An example of the touch sensor integrated type display device includes U.S. Pat. No. 7,859,521.

A touch sensor integrated type display device disclosed in U.S. Pat. No. 7,859,521 divides display common electrodes and allows the display common electrodes to serve as touch driving electrodes and touch sensing electrodes. Hence, the touch sensor integrated type display device disclosed in U.S. Pat. No. 7,859,521 measures changes in a mutual capacitance generated in a touch operation and recognizes a touch or non-touch input and a touch position in the touch input.

In the above configuration of the touch sensor integrated type display device, because the touch driving electrodes and the touch sensing electrodes are formed on the same layer, the touch driving electrodes and the touch sensing electrodes are each interconnected by wires according to their functions, so as to avoid contact with different types of electrodes. Namely, the touch driving electrodes are connected to touch driving electrode wires through driving electrode contact holes, and the touch sensing electrodes are connected to touch sensing electrode wires through sensing electrode contact holes. Hence, the touch driving electrodes and the touch sensing electrodes do not electrically contact each other.

However, in the related art touch sensor integrated type display device, the touch driving electrode wires and the touch sensing electrode wires are complex, and also many contact holes are required to connect the touch driving electrodes with the touch driving electrode wires and to connect the touch sensing electrodes with the touch sensing electrode wires. Therefore, an aperture ratio of the display device is reduced.

SUMMARY OF THE INVENTION

Accordingly, the present invention is directed to a touch sensor integrated type display device that substantially obviates one or more of the problems due to limitations and disadvantages of the related art.

An object of the present invention is to provide a touch sensor integrated type display device having improved aperture ratio by simply and efficiently forming complex wires for touch driving electrodes and touch sensing electrodes.

Another object of the present invention is to provide a touch sensor integrated type display device having improved touch performance by reducing a mutual capacitance between a touch driving electrode and a touch sensing electrode and a parasitic capacitance between a signal wire of the display device and a touch electrode of a touch sensor.

Additional features and advantage of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purposed of the present invention, as embodied and broadly described, a touch sensor integrated type display device comprises a plurality of gate lines and a plurality of data lines crossing over the gate lines, a plurality of pixel electrodes respectively disposed in areas defined by the crossing of the gate lines and the data lines; a plurality of 1-1 electrodes, each of which is disposed correspondingly to some of the plurality of pixel electrodes and has a first size; a plurality of 1-2 electrodes connected to the plurality of 1-1 electrodes, each of which is disposed correspondingly to another some of the plurality of pixel electrodes, and has a second size greater than the first size; and a plurality of second electrodes, each of which is disposed between the 1-1 electrode and the 1-2 electrode and is arranged in a direction crossing the 1-1 electrodes and the 1-2 electrodes, wherein two 1-1 electrodes are disposed between the 1-2 electrodes in parallel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts.

Figure 1:
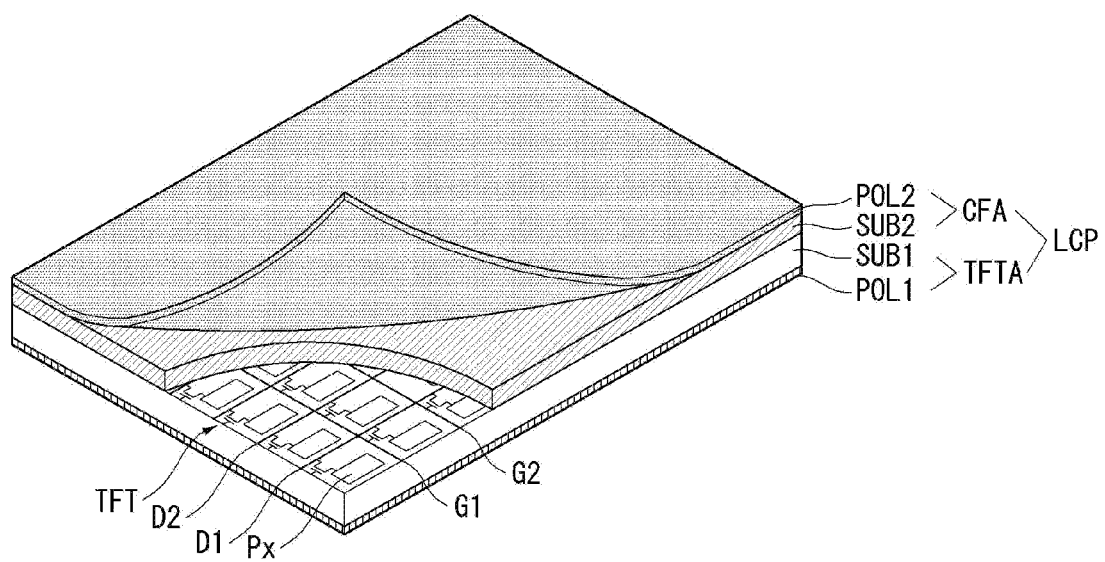
FIG. 1 is a partial exploded perspective view schematically showing a touch sensor integrated type display device according to embodiments of the invention.
Figure 2:
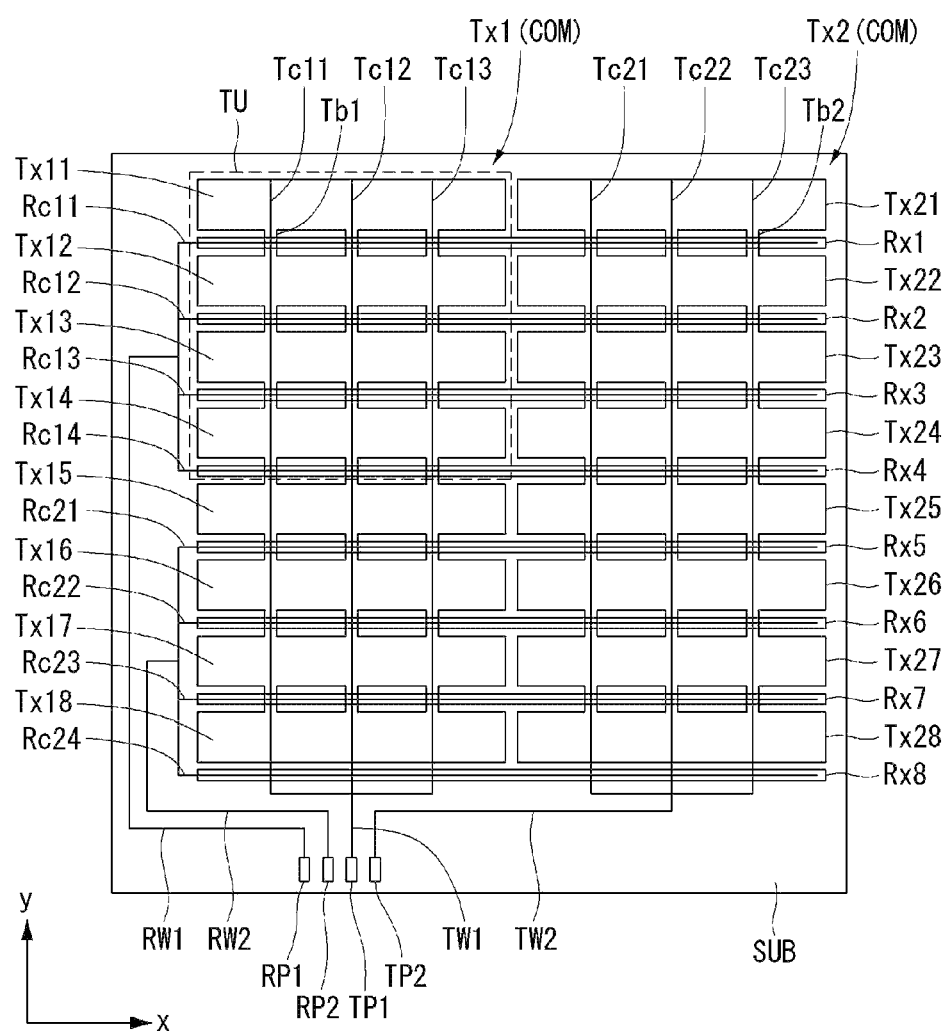
FIG. 2 is a plane view schematically showing a touch sensor integrated type display device according to a first embodiment of the invention.

A touch sensor integrated type display device according to an exemplary embodiment of the invention is described with reference to FIGS. 1 and 2. FIG. 1 is a partial exploded perspective view schematically showing a touch sensor integrated type display device according to embodiments of the invention. FIG. 2 is a plane view schematically showing a relationship between a touch driving electrode serving as a common electrode and a touch sensing electrode in a touch sensor integrated type display device according to a first embodiment of the invention.

As shown in FIG. 1, the touch sensor integrated type display device according to the embodiments of the invention includes a liquid crystal display panel LCP having a thin film transistor (TFT) array TFTA and a color filter array CFA which are positioned opposite each other with a liquid crystal layer (not shown) interposed therebetween.

The TFT array TFTA includes a plurality of gate lines G1 and G2 which are formed in parallel in a first direction (for example, x-axis direction) on a first substrate SUB1, a plurality of data lines D1 and D2 which are formed in parallel in a second direction (for example, y-axis direction) to cross over the plurality of gate lines G1 and G2, liquid crystal cells positioned in areas defined by the crossing of the gate lines G1 and G2 and the data lines D1 and D2, thin film transistors TFT formed at crossings of the gate lines G1 and G2 and the data lines D1 and D2, a plurality of pixel electrodes Px for charging the liquid crystal cells to a data voltage, and a plurality of common electrodes (not shown) which are disposed to form an electric field along with the plurality of pixel electrodes Px.

The color filter array CFA includes black matrixes (not shown) and color filters (not shown), which are formed on a second substrate SUB2. Polarizing plates POL1 and POL2 are respectively attached to external surfaces of the first substrate SUB1 and the second substrate SUB2 of the liquid crystal display panel LCP. Alignment layers (not shown) for setting a pre-tilt angle of liquid crystals are respectively formed on inner surfaces of the first substrate SUB1 and the second substrate SUB2 contacting the liquid crystals. A column spacer may be formed between the TFT array TFTA and the color filter array CFA of the liquid crystal display panel LCP to maintain cell gaps of the liquid crystal cells.

The common electrodes are formed on the second substrate SUB2 in a vertical electric field driving manner, such as a twisted nematic (TN) mode and a vertical alignment (VA) mode. Further, the common electrodes are formed on the first substrate SUB1 along with the pixel electrodes Px in a horizontal electric field driving manner, such as an in-plane switching (IPS) mode and a fringe field switching (FFS) mode. In the following description, the embodiment of the invention is described based on the horizontal electric field driving manner as an example.

As shown in FIG. 2, a common electrode COM of the touch sensor integrated type display device according to the first embodiment of the invention includes a plurality of electrodes Tx1 and Tx2 which are divided in a first direction (for example, x-axis direction) or a second direction (for example, y-axis direction). In the first embodiment of the invention shown in FIG. 2, the divided common electrodes Tx1 and Tx2 are arranged in the second direction (i.e., y-axis direction) and form a plurality of columns. Further, the divided common electrodes Tx1 and Tx2 serve as a plurality of touch driving electrodes constituting a touch sensor.

Each of the plurality of touch driving electrodes Tx1 and Tx2 includes a plurality of bottlenecks which are arranged in parallel in the x-axis direction along the y-axis direction at crossings of the plurality of touch driving electrodes Tx1 and Tx2 and a plurality of touch sensing electrodes Rx1 to Rx8 and each have a narrow width. More specifically, the first touch driving electrode Tx1 is configured such that a plurality of first touch driving electrode patterns Tx11 to Tx18 arranged in the x-axis direction along the y-axis direction are connected through first bottlenecks Tb1. Further, the second touch driving electrode Tx2 is configured such that a plurality of second touch driving electrode patterns Tx21 to Tx28 arranged in the x-axis direction along the y-axis direction are connected through second bottlenecks Tb2 in the same manner as the first touch driving electrode Tx1.

First and second touch driving electrode resistance reducing wires Tc11 to Tc13 and Tc21 to Tc23 are respectively disposed on the first and second touch driving electrodes Tx1 and Tx2, so that the wires Tc11 to Tc13 and Tc21 to Tc23 respectively pass through the first and second bottlenecks Tb1 and Tb2 arranged in the y-axis direction. More specifically, the first touch driving electrode resistance reducing wires Tc11 to Tc13 are disposed so that they pass through the first touch driving electrode patterns Tx11 to Tx18 and the first bottlenecks Tb1 of the y-axis direction connecting the first touch driving electrode patterns Tx11 to Tx18. Further, the second touch driving electrode resistance reducing wires Tc21 to Tc23 are disposed so that they pass through the second touch driving electrode patterns Tx21 to Tx28 and the second bottlenecks Tb2 of the y-axis direction connecting the second touch driving electrode patterns Tx21 to Tx28. The first touch driving electrode resistance reducing wires Tc11 to Tc13 directly contact the first touch driving electrode Tx1 and thus reduce a resistance of the first touch driving electrode Tx1 formed of a transparent conductive material with a high resistance. The second touch driving electrode resistance reducing wires Tc21 to Tc23 directly contact the second touch driving electrode Tx2 and thus reduce a resistance of the second touch driving electrode Tx2 formed of a transparent conductive material with a high resistance.

The first touch driving electrode resistance reducing wires Tc11 to Tc13 are connected to each other outside an area, in which the touch driving electrodes Tx1 and Tx2 and the touch sensing electrodes Rx1 to Rx8 are formed, and are connected to a first touch driving routing pad TP1 through a first touch driving routing wire TW1. The second touch driving electrode resistance reducing wires Tc21 to Tc23 are connected to each other outside the area, in which the touch driving electrodes Tx1 and Tx2 and the touch sensing electrodes Rx1 to Rx8 are formed, and are connected to a second touch driving routing pad TP2 through a second touch driving routing wire TW2.

The first embodiment of the invention shown in FIG. 2 shows an example where the touch driving electrodes are implemented as two touch driving lines, namely, a first touch driving line including the first touch driving electrode Tx1 and the first touch driving electrode resistance reducing wires Tc11 to Tc13 and a second touch driving line including the second touch driving electrode Tx2 and the second touch driving electrode resistance reducing wires Tc21 to Tc23.

Further, the first embodiment of the invention shown in FIG. 2 shows an example where the three first touch driving electrode resistance reducing wires Tc11 to Tc13 are used to form the first touch driving line, and the three second touch driving electrode resistance reducing wires Tc21 to Tc23 are used to form the second touch driving line. However, the embodiment of the invention is not limited thereto. For example, one or two touch driving electrode resistance reducing wire(s) may be used, or four or more touch driving electrode resistance reducing wires may be used.

The touch sensing electrodes Rx1 to Rx8 constituting the touch sensor are arranged in the x-axis direction between the touch driving electrode patterns (i.e., between Tx11, Tx21 and Tx12, Tx22, between Tx12, Tx22 and Tx13, Tx23, between Tx13, Tx23 and Tx14, Tx24, between Tx14, Tx24 and Tx15, Tx25, between Tx15, Tx25 and Tx16, Tx26, between Tx16, Tx26 and Tx17, Tx27, and between Tx17, Tx27 and Tx18, Tx28) which are adjacent to each other in the y-axis direction, and on the lower side of the lowermost touch driving electrode patterns Tx18 and Tx28, so that the touch sensing electrodes Rx1 to Rx8 cross over the first and second bottlenecks Tb1 and Tb2 and the first and second touch driving electrode resistance reducing wires Tc11 to Tc13 and Tc21 to Tc23. Each of the touch sensing electrodes Rx1 to Rx8 includes bottlenecks Rb at crossings of the first and second bottlenecks Tb1 and Tb2 and the touch sensing electrodes.

First to eighth touch sensing electrode resistance reducing wires Rc11 to Rc14 and Rc21 to Rc24 for the resistance reduction are respectively formed on the touch sensing electrodes Rx1 to Rx8. The touch sensing electrodes Rx1 to Rx8 are separated from one another. The first to fourth touch sensing electrodes Rx1 to Rx4 and the first to fourth touch sensing electrode resistance reducing wires Rc11 to Rc14 respectively contacting the first to fourth touch sensing electrodes Rx1 to Rx4 are grouped to form a first touch sensing line, and the fifth to eighth touch sensing electrodes Rx5 to Rx8 and the fifth to eighth touch sensing electrode resistance reducing wires Rc21 to Rc24 respectively contacting the fifth to eighth touch sensing electrodes Rx5 to Rx8 are grouped to form a second touch sensing line.

The first touch sensing line (Rx1 to Rx4 and Rc11 to Rc14) is connected to each other outside the area, in which the touch driving electrodes Tx1 and Tx2 and the touch sensing electrodes Rx1 to Rx8 are formed, and is connected to a first touch sensing routing pad RP1 through a first touch sensing routing wire RW1. The second touch sensing line (Rx5 to Rx8 and Rc21 to Rc24) is connected to each other outside the area, in which the touch driving electrodes Tx1 and Tx2 and the touch sensing electrodes Rx1 to Rx8 are formed, and is connected to a second touch sensing routing pad RP2 through a second touch sensing routing wire RW2.

As described above, the touch sensor integrated type display device according to the first embodiment of the invention includes the first and second touch driving electrodes Tx1 and Tx2 and the first to eighth touch sensing electrodes Rx1 to Rx8. As shown in FIG. 2, the plurality of touch driving electrodes Tx1 and Tx2 and the plurality of touch sensing electrodes Rx1 to Rx8 may be properly grouped using the first and second touch driving electrode resistance reducing wires Tc11 to Tc13 and Tc21 to Tc23 and the first to eighth touch sensing electrode resistance reducing wires Rc11 to Rc14 and Rc21 to Rc24 to unit touch recognition blocks TU for the touch recognition. FIG. 2 shows an example where the two touch driving electrodes Tx1 and Tx2 and the eight touch sensing electrodes Rx1 to Rx8 form four unit touch recognition blocks TU.

All of the above-described touch driving electrodes Tx1 and Tx2 also serve as the common electrode COM and are formed on the first substrate SUB1 of the TFT array TFTA along with the pixel electrodes Px in the horizontal electric field driving manner. The pixel electrodes Px are formed in areas defined by the crossing of the gate lines and the data lines.

Each of the first and second touch driving electrode patterns Tx11 to Tx18 and Tx21 to Tx28 serving as the common electrode COM may be formed correspondingly to a plurality of unit pixel electrodes (each including a plurality of subpixels required to represent color) of one line.

As described above, in the touch sensor integrated type display device according to the first embodiment of the invention, each of the first and second touch driving electrode patterns Tx11 to Tx18 and Tx21 to Tx28 may be formed correspondingly to the plurality of unit pixel electrodes of one line. Further, each of the first and second touch driving electrode resistance reducing wires Tc11 to Tc13 and Tc21 to Tc23 may be formed correspondingly to one data line or n data lines, where n is a natural number equal to or greater than 2. Further, each of the touch sensing electrodes Rx1 to Rx8 may be formed correspondingly to one gate line or n gate lines according to the rule.

Figure 3:
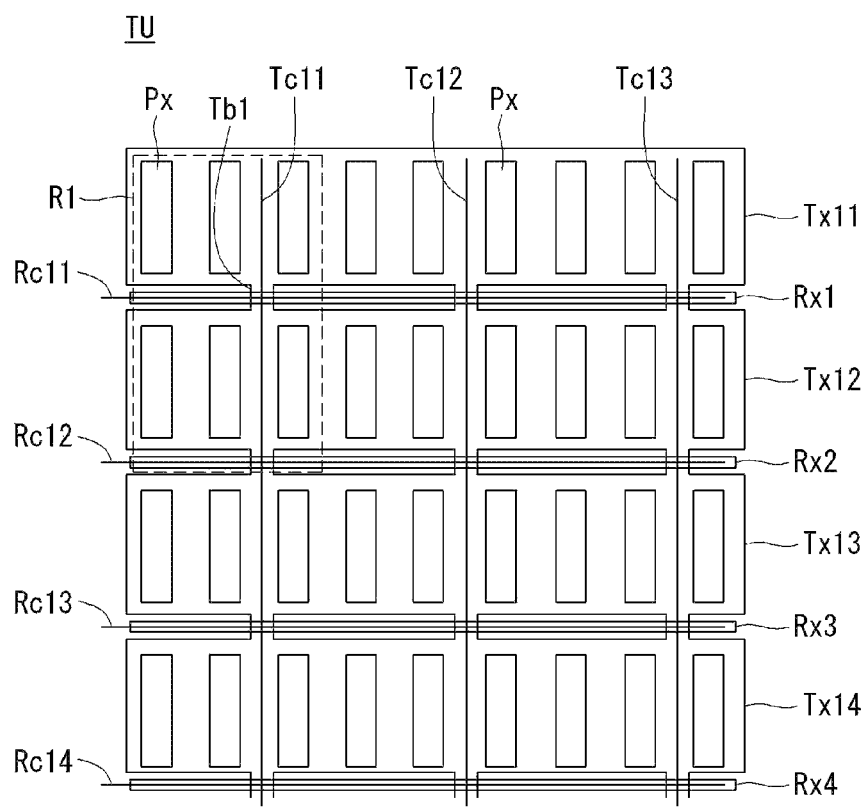
FIG. 3 is a plane view schematically showing a relationship between common electrodes (touch driving electrodes), touch sensing electrodes, and pixel electrodes in a unit touch recognition block TU shown in FIG. 2.

A relationship between the common electrodes (the touch driving electrodes), the touch sensing electrodes, and the pixel electrodes in the touch sensor integrated type display device according to the first embodiment of the invention is described in detail below with reference to FIG. 3. FIG. 3 is a plane view schematically showing a relationship between the common electrodes (the touch driving electrodes), the touch sensing electrodes, and the pixel electrodes in the unit touch recognition block TU shown in FIG. 2. Since the four unit touch recognition blocks TU shown in FIG. 2 have substantially the same configuration, only one unit touch recognition block is described in FIG. 3 for the sake of brevity and ease of reading.

As shown in FIG. 3, the plurality of pixel electrodes Px are arranged in parallel in each of the first touch driving electrode patterns Tx11 to Tx18 along an arrangement direction of the touch driving electrode patterns Tx11 to Tx18. Namely, the plurality of unit pixel electrodes are arranged in a line in the x-axis direction in each of the first touch driving electrode patterns Tx11 to Tx18. FIG. 3 shows an example where the three unit pixel electrodes (each including three subpixels, and the subpixel is hereinafter referred to as the pixel electrode) are arranged in each of the touch driving electrode patterns Tx11 to Tx14.

Figure 4A:
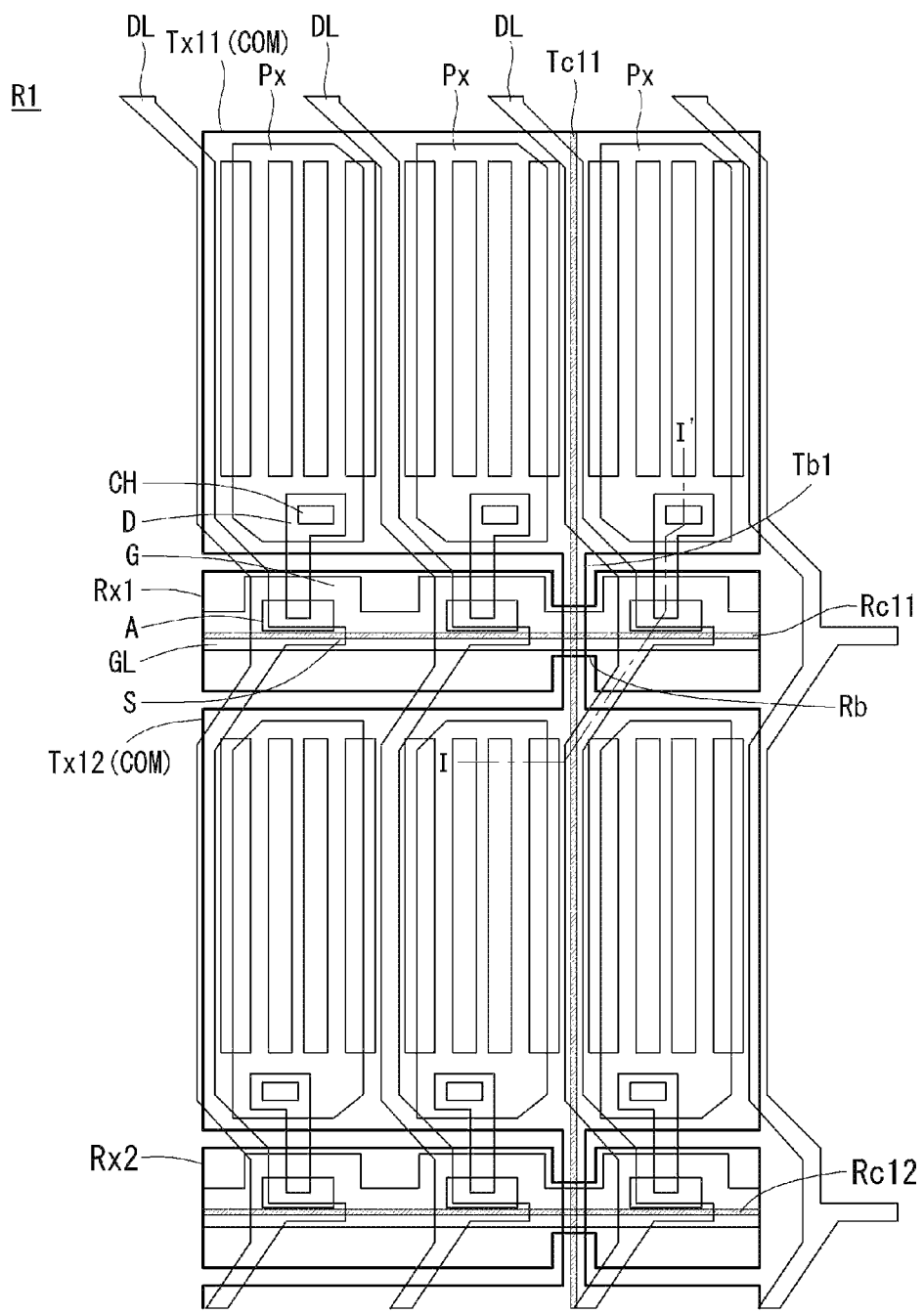
FIG. 4A is a plane view showing an example where a common electrode is formed on a pixel electrode in a region R1 shown in FIG. 3.
Figure 4B:
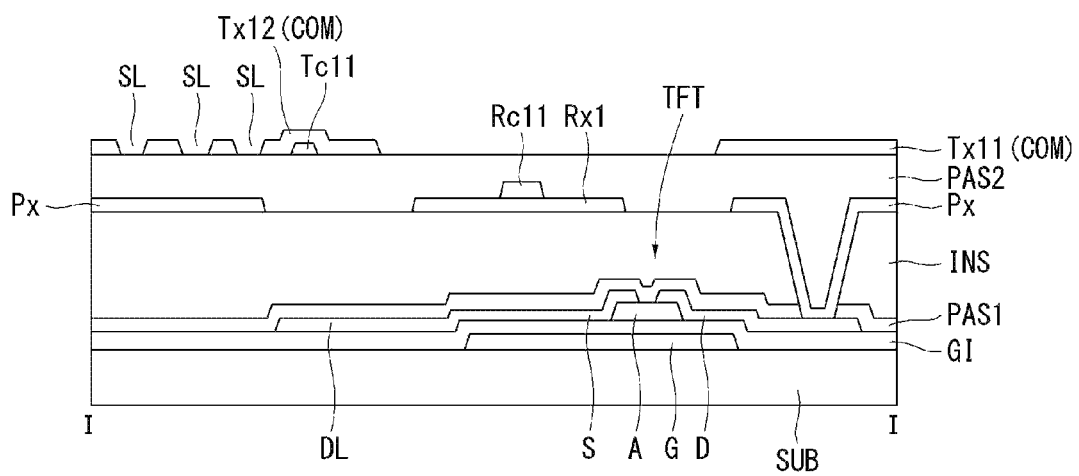
FIG. 4B is a cross-sectional view taken along line I-I' of FIG. 4A.

Next, the touch sensor integrated type display device according to the first embodiment of the invention, in which the common electrode (the touch driving electrode) is formed on the pixel electrode, is described with reference to FIGS. 4A and 4B. FIG. 4A is a plane view showing an example where the common electrode is formed on the pixel electrode in a region R1 shown in FIG. 3. FIG. 4B is a cross-sectional view taken along line I-I' of FIG. 4A.

For the sake of simplicity, the following description will be given focusing on the pixel electrodes Px disposed in the region R1 including a partial area of the two touch driving electrode patterns Tx11 and Tx12 and a partial area of the two touch sensing electrodes Rx1 and Rx2 adjacent to the touch driving electrode patterns Tx11 and Tx12. In the embodiment of the invention, 'Px' denotes the subpixels required to represent the color, the three subpixels form one unit pixel electrode, and each subpixel is simply referred to as the pixel electrode.

As shown in FIGS. 3, 4A, and 4B, the touch sensor integrated type display device according to the first embodiment of the invention includes gate lines GL and data lines DL formed to cross over each other on a substrate SUB1 of a thin film transistor array TFTA, thin film transistors TFT formed at crossings of the gate lines GL and the data lines DL, pixel electrodes Px formed in areas defined by the crossing of the gate lines GL and the data lines DL, and common electrodes COM positioned opposite the pixel electrodes Px. In the first embodiment of the invention, the common electrodes COM serve as touch driving electrodes Tx. Thus, the common electrode COM is hereinafter referred to as the touch driving electrode Tx, the touch driving electrode Tx serving as the common electrode, or the common electrode COM serving as the touch driving electrode, if necessary or desired.

In the above configuration of the display device, the gate line GL is formed on the substrate SUB1, and a gate insulating layer GI is formed on the gate line GL. An active layer A, a source electrode S, and a drain electrode D constituting the thin film transistor TFT are formed on the gate insulating layer GI.

Namely, the thin film transistor TFT includes a gate electrode G extending from the gate line GL formed on the substrate SUB1, the active layer A formed in an area corresponding to the gate electrode G on the gate insulating layer GI covering the gate line GL and the gate electrode G, and the source electrode S and the drain electrode D which are separated from each other on the gate insulating layer GI and extend from the data line DL, so as to expose a portion of the active layer A.

The embodiment of the invention has described as an example a thin film transistor having a gate bottom structure, in which the gate electrode is formed under the source and drain electrodes, but is not limited to this example. The embodiment of the invention should be understood that a thin film transistor having a gate top structure, in which the gate electrode is formed on the source and drain electrodes, is available. Since the thin film transistor having the gate top structure is well known, a detailed description thereof will be omitted.

A first passivation layer PAS1 covering the thin film transistor TFT and the data line DL is formed on the gate insulating layer GI, on which the thin film transistor TFT and the data line DL are formed, and an organic insulating layer INS, such as photoacryl, for planarization is formed on the first passivation layer PAS1. A contact hole CH exposing a portion of the drain electrode D is formed in the organic insulating layer INS and the first passivation layer PAS1.

The pixel electrodes Px are formed on the organic insulating layer INS and are respectively arranged in pixel areas defined by the crossing of the data lines DL and the gate lines GL. The pixel electrode Px is formed so that it contacts the drain electrode D of the thin film transistor TFT through the contact hole CH passing through the organic insulating layer INS and the first passivation layer PAS1.

Touch sensing electrodes Rx1 and Rx2 are formed on the organic insulating layer INS in parallel with the gate line GL and are positioned between the adjacent pixel electrodes Px arranged in the y-axis direction. Each of the touch sensing electrodes Rx1 and Rx2 includes a bottleneck Rb having a narrow width at a crossing of a bottleneck Tb1 of the touch driving electrode and the touch sensing electrode. Touch sensing electrode resistance reducing wires Rc11 and Rc12 are respectively formed on the touch sensing electrodes Rx1 and Rx2 in parallel with the gate line GL.

A second passivation layer PAS2 is formed on the organic insulating layer INS, on which the pixel electrodes Px, the touch driving electrode patterns Tx11 and Tx12, and the touch sensing electrode resistance reducing wires Rc11 and Rc12 are formed.

The touch driving electrode resistance reducing wire Tc11 is formed on the second passivation layer PAS2 and overlaps the data line DL. The touch driving electrode resistance reducing wire Tc11 is formed so that it passes through the bottleneck Tb1 of the touch driving electrode pattern Tx11 and crosses over the bottleneck Rb of the touch sensing electrode.

The touch driving electrode patterns Tx11 and Tx12 serving as the common electrode are formed on the second passivation layer PAS2, on which the touch driving electrode resistance reducing wire Tc11 is formed. The touch driving electrode patterns Tx11 and Tx12 are formed to overlap the pixel electrode Px. Each of the touch driving electrode patterns Tx11 and Tx12 includes a plurality of slits SL, so that a horizontal electric field is easily formed between the pixel electrodes Px and the touch driving electrode patterns. Thus, the pixel electrodes Px formed on the organic insulating layer INS do not have the slit, and the touch driving electrode patterns Tx11 and Tx12 formed on the second passivation layer PAS2 each have the slits.

Figure 5A:
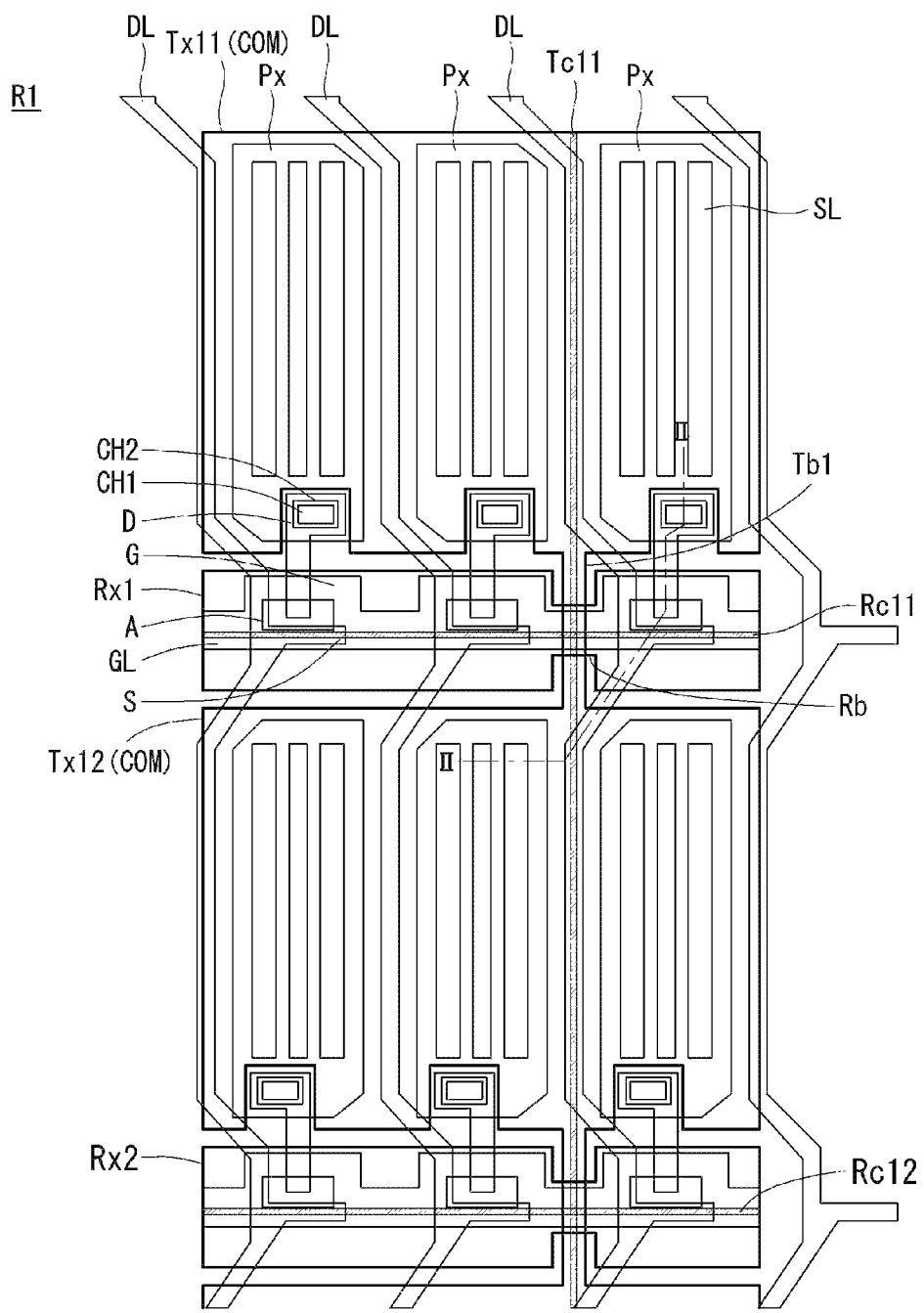
FIG. 5A is a plane view showing an example where a pixel electrode is formed on a common electrode in a region R1 shown in FIG. 3.
Figure 5B:
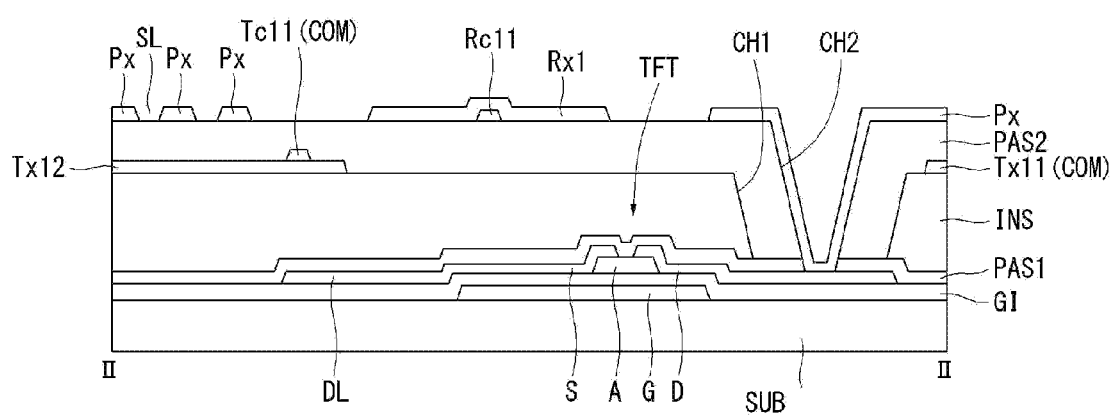
FIG. 5B is a cross-sectional view taken along line II-II' of FIG. 5A.

Next, the touch sensor integrated type display device according to a modification of the first embodiment of the invention, in which the pixel electrode is formed on the common electrode (the touch driving electrode), is described with reference to FIGS. 5A and 5B. FIG. 5A is a plane view showing an example where the pixel electrode is formed on the common electrode in a region R1 shown in FIG. 3. FIG. 5B is a cross-sectional view taken along line II-II' of FIG. 5A.

As shown in FIGS. 3, 5A, and 5B, the touch sensor integrated type display device according to the modification of the first embodiment of the invention includes gate lines GL and data lines DL formed to cross over each other on a substrate SUB1 of a thin film transistor array TFTA, thin film transistors TFT formed at crossings of the gate lines GL and the data lines DL, pixel electrodes Px formed in areas defined by the crossing of the gate lines GL and the data lines DL, and common electrodes COM positioned opposite the pixel electrodes Px. In the modification of the first embodiment of the invention, the common electrodes COM serves as touch driving electrodes Tx in the same manner as the first embodiment of the invention. Thus, the common electrode COM is hereinafter referred to as the touch driving electrode Tx, the touch driving electrode Tx serving as the common electrode, or the common electrode COM serving as the touch driving electrode, if necessary or desired.

In the above configuration of the display device, the gate line GL is formed on the substrate SUB1, and a gate insulating layer GI is formed on the gate line GL. An active layer A, a source electrode S, and a drain electrode D constituting the thin film transistor TFT are formed on the gate insulating layer GI.

Namely, the thin film transistor TFT includes a gate electrode G extending from the gate line GL formed on the substrate SUB1, the active layer A formed in an area corresponding to the gate electrode G on the gate insulating layer GI covering the gate line GL and the gate electrode G, and the source electrode S and the drain electrode D which are separated from each other on the gate insulating layer GI and extend from the data line DL, so as to expose a portion of the active layer A.

The embodiment of the invention has described as an example a thin film transistor having a gate bottom structure, in which the gate electrode is formed under the source and drain electrodes, but is not limited to this example. The embodiment of the invention should be understood that a thin film transistor having a gate top structure, in which the gate electrode is formed on the source and drain electrodes, is available. Since the thin film transistor having the gate top structure is well known, a detailed description thereof will be omitted.

A first passivation layer PAS1 covering the thin film transistor TFT and the data line DL is formed on the gate insulating layer GI, on which the thin film transistor TFT and the data line DL are formed, and an organic insulating layer INS, such as photoacryl, for planarization is formed on the first passivation layer PAS1. A first contact hole CH1 is formed in the organic insulating layer INS and exposes the first passivation layer PAS1 of a position corresponding to a portion of the drain electrode D.

Touch driving electrode patterns Tx11 and Tx12 serving as the common electrode, which are connected to each other through a first bottleneck Tb1, are formed on the organic insulating layer INS, in which the first contact hole CH1 is formed. A touch driving electrode resistance reducing wire Tc11 is formed on the touch driving electrode patterns Tx11 and Tx12, so that it passes through the first bottleneck Tb1 of the touch driving electrode along the data line DL.

A second passivation layer PAS2 is formed on the organic insulating layer INS, on which the touch driving electrode patterns Tx11 and Tx12 and the touch driving electrode resistance reducing wire Tc11 are formed. A second contact hole CH2 is formed in the first passivation layer PAS1 exposed through the first contact hole CH1 of the organic insulating layer INS and the second passivation layer PAS2 and exposes a portion of the drain electrode D of the thin film transistor TFT.

Touch sensing electrode resistance reducing wires Rc11 and Rc12 are formed on the second passivation layer PAS2, in which the second contact hole CH2 is formed, in a direction (i.e., the x-axis direction) parallel to the gate line GL. Pixel electrodes Px are formed on the second passivation layer PAS2, on which the touch sensing electrode resistance reducing wires Rc11 and Rc12 are formed, and are respectively positioned in pixel areas defined by the crossing of the data lines DL and the gate lines GL. Touch sensing electrodes Rx1 and Rx2 are formed between the pixel electrodes Px, which are adjacent to each other in the y-axis direction, in parallel with the gate line GL, so as to cover the touch sensing electrode resistance reducing wire Rc11. The touch sensing electrodes Rx1 and Rx2 are disposed in a space between the touch driving electrode patterns Tx11 and Tx12. Each of the touch sensing electrodes Rx1 and Rx2 includes a bottleneck Rb at a crossing of the touch sensing electrode and the bottleneck Tb1 connecting the adjacent touch driving electrode patterns Tx11 and Tx12.

The pixel electrodes Px overlap the touch driving electrode patterns Tx11 and Tx12. Each pixel electrode Px includes a plurality of slits SL, so that a horizontal electric field is easily formed between the pixel electrodes Px and the touch driving electrode patterns Tx11 and Tx12. Thus, the touch driving electrode patterns Tx11 and Tx12 formed on the organic insulating layer INS do not have the slit, and the pixel electrodes Px formed on the second passivation layer PAS2 each have the slits.

The touch sensor integrated type display device according to the first embodiment of the invention and the modification of the first embodiment may obtain an advantage of easily designing the touch driving electrodes, the touch sensing electrodes, and the wires, which constitute the touch sensors, based on the design of the unit pixel electrodes, the gate lines, and the data lines.

Further, because the contact hole for connecting the touch driving electrode with the touch sensing electrode resistance reducing wires is not required in the first embodiment of the invention and the modification of the first embodiment, an aperture ratio of the display device may increase. Hence, the embodiment of the invention may be advantageous to the large-sized products with a high resolution.

Figure 6:
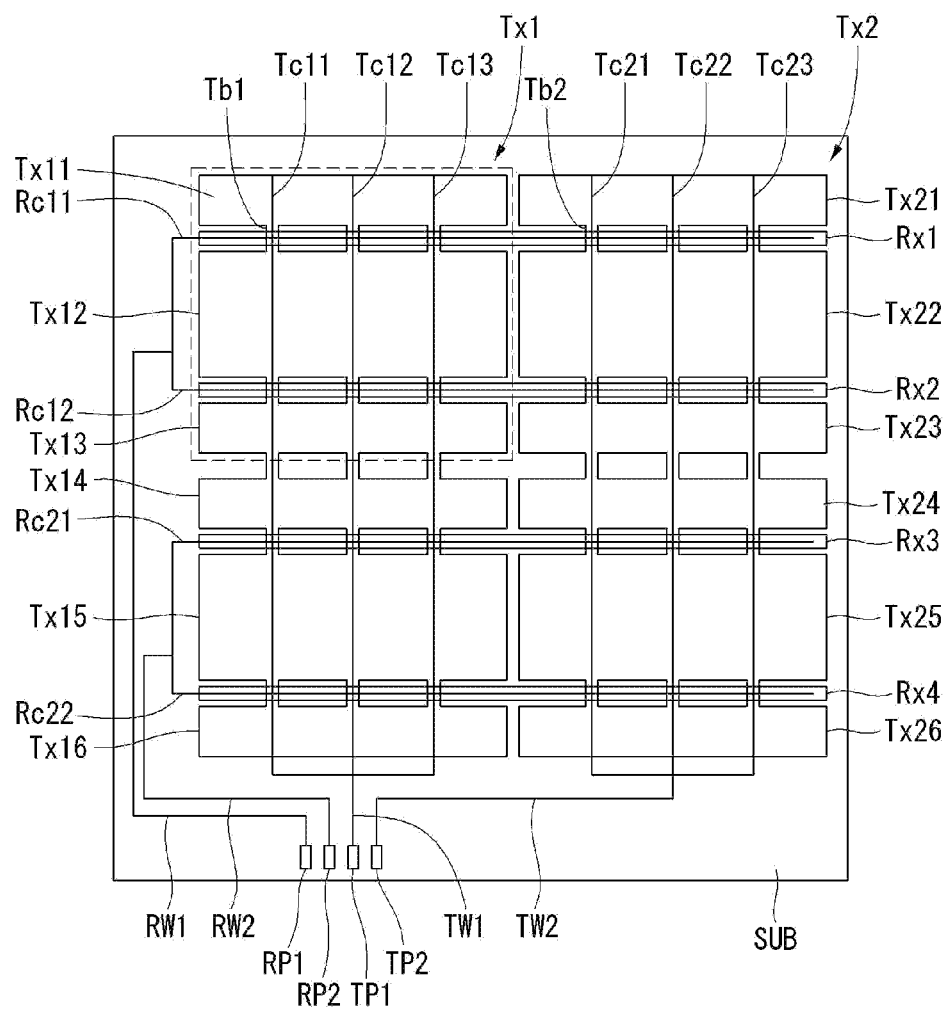
FIG. 6 is a plane view schematically showing a relationship between a touch driving electrode serving as a common electrode and a touch sensing electrode in a touch sensor integrated type display device according to a second embodiment of the invention.

Next, a touch sensor integrated type display device according to a second embodiment of the invention is described with reference to FIG. 6. FIG. 6 is a plane view schematically showing a relationship between a touch driving electrode serving as a common electrode and a touch sensing electrode in the touch sensor integrated type display device according to the second embodiment of the invention.

As shown in FIG. 6, a common electrode COM of the touch sensor integrated type display device according to the second embodiment of the invention includes a plurality of electrodes Tx1 and Tx2 which are divided in a first direction (for example, x-axis direction) or a second direction (for example, y-axis direction). In the second embodiment of the invention shown in FIG. 6, the divided common electrodes Tx1 and Tx2 are arranged in the second direction (i.e., y-axis direction) and form a plurality of columns. Further, the divided common electrodes Tx1 and Tx2 serve as a plurality of touch driving electrodes constituting a touch sensor.

Each of the plurality of touch driving electrodes Tx1 and Tx2 includes a plurality of bottlenecks which are arranged in parallel in the x-axis direction along the y-axis direction at crossings of the plurality of touch driving electrodes Tx1 and Tx2 and a plurality of touch sensing electrodes Rx1 to Rx4 and each have a narrow width. Namely, the first touch driving electrode Tx1 is configured such that a plurality of first touch driving electrode patterns Tx11 to Tx16 arranged in the x-axis direction along the y-axis direction are connected through first bottlenecks Tb1. Further, the second touch driving electrode Tx2 is configured such that a plurality of second touch driving electrode patterns Tx21 to Tx26 arranged in the x-axis direction along the y-axis direction are connected through second bottlenecks Tb2 in the same manner as the first touch driving electrode Tx1.

The first and second touch driving electrodes Tx1 and Tx2 respectively include the first and second touch driving electrode patterns Tx11 to Tx16 and Tx21 to Tx26 having two different sizes.

More specifically, the first touch driving electrode Tx1 includes 1-1 touch driving electrode patterns Tx11, Tx13, Tx14, and Tx16 each having a first size and 1-2 touch driving electrode patterns Tx12 and Tx15 each having a second size, which is about two times the first size. In FIG. 6, the first touch driving electrode Tx1 includes the 1-1 touch driving electrode pattern Tx11, the 1-2 touch driving electrode pattern Tx12, the two 1-1 touch driving electrode patterns Tx13 and Tx14, the 1-2 touch driving electrode pattern Tx15, and the 1-1 touch driving electrode pattern Tx16 arranged in the order named.

Further, the second touch driving electrode Tx2 includes 2-1 touch driving electrode patterns Tx21, Tx23, Tx24, and Tx26 each having a first size and 2-2 touch driving electrode patterns Tx22 and Tx25 each having a second size, which is about two times the first size. In other words, the second touch driving electrode Tx2 includes the 2-1 touch driving electrode pattern Tx21, the 2-2 touch driving electrode pattern Tx22, the two 2-1 touch driving electrode patterns Tx23 and Tx24, the 2-2 touch driving electrode pattern Tx25, and the 2-1 touch driving electrode pattern Tx26 arranged in the order named.

First and second touch driving electrode resistance reducing wires Tc11 to Tc13 and Tc21 to Tc23 are respectively disposed on the first and second touch driving electrodes Tx1 and Tx2, so that the wires Tc11 to Tc13 and Tc21 to Tc23 respectively pass through the first and second bottlenecks Tb1 and Tb2 arranged in the y-axis direction. More specifically, the first touch driving electrode resistance reducing wires Tc11 to Tc13 are disposed so that they pass through the first touch driving electrode patterns Tx11 to Tx16 and the first bottlenecks Tb1 of the y-axis direction connecting the first touch driving electrode patterns Tx11 to Tx16. Further, the second touch driving electrode resistance reducing wires Tc21 to Tc23 are disposed so that they pass through the second touch driving electrode patterns Tx21 to Tx26 and the second bottlenecks Tb2 of the y-axis direction connecting the second touch driving electrode patterns Tx21 to Tx26. The first touch driving electrode resistance reducing wires Tc11 to Tc13 directly contact the first touch driving electrode Tx1 and thus reduce a resistance of the first touch driving electrode Tx1 formed of a transparent conductive material with a high resistance. The second touch driving electrode resistance reducing wires Tc21 to Tc23 directly contact the second touch driving electrode Tx2 and thus reduce a resistance of the second touch driving electrode Tx2 formed of a transparent conductive material with a high resistance.

The first touch driving electrode resistance reducing wires Tc11 to Tc13 are connected to each other outside an area, in which the touch driving electrodes Tx1 and Tx2 and the touch sensing electrodes Rx1 to Rx4 are formed, and are connected to a first touch driving routing pad TP1 through a first touch driving routing wire TW1. The second touch driving electrode resistance reducing wires Tc21 to Tc23 are connected to each other outside the area, in which the touch driving electrodes Tx1 and Tx2 and the touch sensing electrodes Rx1 to Rx4 are formed, and are connected to a second touch driving routing pad TP2 through a second touch driving routing wire TW2.

The second embodiment of the invention shown in FIG. 6 shows an example where the touch driving electrodes are implemented as two touch driving lines, namely, a first touch driving line including the first touch driving electrode Tx1 and the first touch driving electrode resistance reducing wires Tc11 to Tc13 and a second touch driving line including the second touch driving electrode Tx2 and the second touch driving electrode resistance reducing wires Tc21 to Tc23.

Further, the second embodiment of the invention shown in FIG. 6 shows an example where the three first touch driving electrode resistance reducing wires Tc11 to Tc13 are used to form the first touch driving line, and the three second touch driving electrode resistance reducing wires Tc21 to Tc23 are used to form the second touch driving line. However, the embodiment of the invention is not limited thereto. For example, one or two touch driving electrode resistance reducing wire(s) may be used, or four or more touch driving electrode resistance reducing wires may be used.

The touch sensing electrodes Rx1 to Rx4 constituting the touch sensor are arranged in the x-axis direction between the 1-1 and 2-1 touch driving electrode patterns and the 1-2 and 2-2 touch driving electrode patterns (i.e., between Tx11, Tx21 and Tx21, Tx22, between Tx12, Tx22 and Tx13, Tx23, between Tx13, Tx23 and Tx14, Tx24, between Tx14, Tx24 and Tx15, Tx25, and between Tx15, Tx25 and Tx16, Tx26) which are adjacent to each other in the y-axis direction, so that the touch sensing electrodes Rx1 to Rx4 cross over the first and second bottlenecks Tb1 and Tb2 and the first and second touch driving electrode resistance reducing wires Tc11 to Tc13 and Tc21 to Tc23. Each of the touch sensing electrodes Rx1 to Rx4 includes bottlenecks Rb at crossings of the first and second bottlenecks Tb1 and Tb2 and the touch sensing electrodes.

First to fourth touch sensing electrode resistance reducing wires Rc11 to Rc12 and Rc21 to Rc22 for the resistance reduction are respectively formed on the touch sensing electrodes Rx1 to Rx4. The touch sensing electrodes Rx1 to Rx4 are separated from one another. The first and second touch sensing electrodes Rx1 and Rx2 and the first and second touch sensing electrode resistance reducing wires Rc11 and Rc12 respectively contacting the first and second touch sensing electrodes Rx1 and Rx2 are grouped to form a first touch sensing line, and the third and fourth touch sensing electrodes Rx3 and Rx4 and the third and fourth touch sensing electrode resistance reducing wires Rc21 and Rc22 respectively contacting the third and fourth touch sensing electrodes Rx3 and Rx4 are grouped to form a second touch sensing line.

The first touch sensing line (Rx1 to Rx2 and Rc11 to Rc12) is connected to each other outside the area, in which the touch driving electrodes Tx1 and Tx2 and the touch sensing electrodes Rx1 to Rx4 are formed, and is connected to a first touch sensing routing pad RP1 through a first touch sensing routing wire RW1. The second touch sensing line (Rx3 to Rx4 and Rc21 to Rc22) is connected to each other outside the area, in which the touch driving electrodes Tx1 and Tx2 and the touch sensing electrodes Rx1 to Rx4 are formed, and is connected to a second touch sensing routing pad RP2 through a second touch sensing routing wire RW2.

As described above, the touch sensor according to the second embodiment of the invention includes the first and second touch driving electrodes Tx1 and Tx2 and the first to fourth touch sensing electrodes Rx1 to Rx4. As shown in FIG. 6, the plurality of touch driving electrodes Tx1 and Tx2 and the plurality of touch sensing electrodes Rx1 to Rx4 may be properly grouped using the first and second touch driving electrode resistance reducing wires Tc11 to Tc13 and Tc21 to Tc23 and the first to fourth touch sensing electrode resistance reducing wires Rc11 to Rc12 and Rc21 to Rc22 to unit touch recognition blocks TU for the touch recognition. FIG. 6 shows an example where the two touch driving electrodes Tx1 and Tx2 and the four touch sensing electrodes Rx1 to Rx4 form the four unit touch recognition blocks TU.

All of the above-described touch driving electrodes Tx1 and Tx2 also serve as the common electrode COM and are formed on a first substrate SUB1 of a TFT array TFTA along with pixel electrodes Px in a horizontal electric field driving manner. The pixel electrodes Px are formed in areas defined by the crossing of gate lines and data lines.

Each of the 1-1 and 2-1 touch driving electrode patterns Tx11, Tx13, Tx14, and Tx16; and Tx21, Tx23, Tx24, and Tx26 of the first size serving as the common electrode COM are formed correspondingly to a plurality of unit pixel electrodes (each including a plurality of subpixels required to represent color) of one line. Further, each of the 1-2 and 2-2 touch driving electrode patterns Tx12 and Tx15; and Tx22 and Tx25 of the second size serving as the common electrode COM are formed correspondingly to a plurality of unit pixel electrodes of two lines.

Each of the first and second touch driving electrode resistance reducing wires Tc11 to Tc13 and Tc21 to Tc23 may be formed correspondingly to one data line or n data lines, where n is a natural number equal to or greater than 2. Further, each of the touch sensing electrodes Rx1 to Rx4 may be formed correspondingly to one gate line or n gate lines according to the rule.

Figure 7:
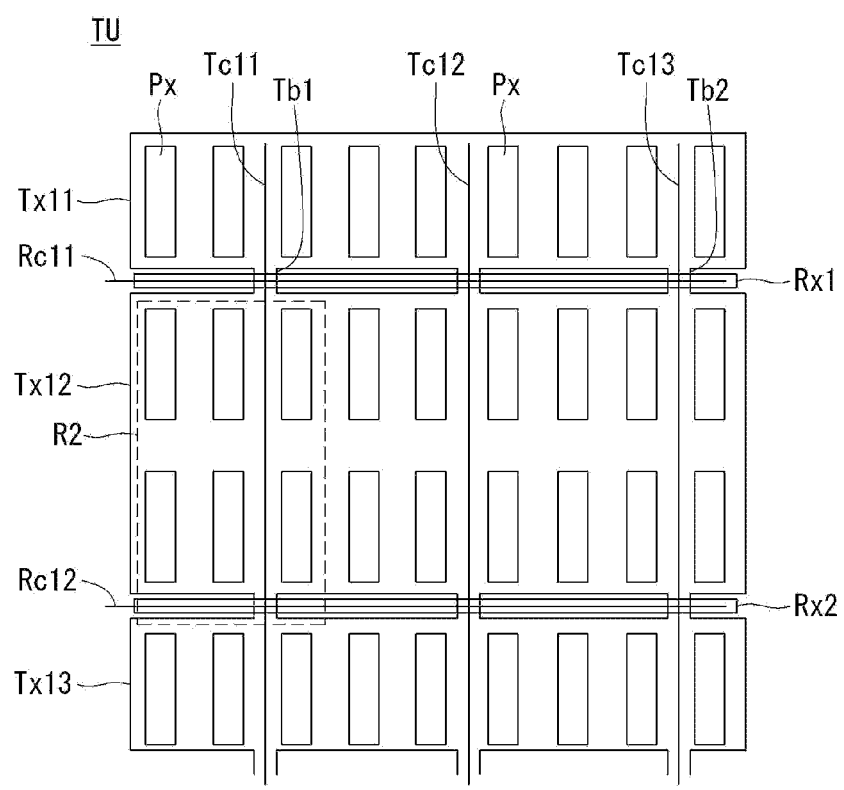
FIG. 7 is a plane view schematically showing a relationship between common electrodes (touch driving electrodes), touch sensing electrodes, and pixel electrodes in a unit touch recognition block TU shown in FIG. 6.

A relationship between the common electrodes (the touch driving electrodes), the touch sensing electrodes, and the pixel electrodes in the touch sensor integrated type display device according to the second embodiment of the invention is described in detail below with reference to FIG. 7. FIG. 7 is a plane view schematically showing a relationship between the common electrodes (touch driving electrodes), the touch sensing electrodes, and the pixel electrodes in the unit touch recognition block TU shown in FIG. 6. Since the four unit touch recognition blocks TU shown in FIG. 6 have substantially the same configuration, only one unit touch recognition block is described in FIG. 7 for the sake of brevity and ease of reading.

As shown in FIG. 7, the plurality of pixel electrodes Px of one line are disposed in each of the 1-1 touch driving electrode patterns Tx11 and Tx13 having the first size. The plurality of pixel electrodes Px of two lines are disposed in the 1-2 touch driving electrode pattern Tx12 having the second size. The touch sensing electrodes Rx1 and Rx2 are respectively disposed between the 1-1 and 1-2 touch driving electrode patterns Tx11 and Tx12 and between the 1-2 and 1-1 touch driving electrode patterns Tx12 and Tx13.

As shown in FIGS. 6 and 7, the touch sensor integrated type display device according to the second embodiment of the invention is different from the touch sensor integrated type display device according to the first embodiment of the invention, in that the touch driving electrode includes the 1-1 touch driving electrode patterns Tx11, Tx13, Tx14, and Tx16 having the first size and the 1-2 touch driving electrode patterns Tx12 and Tx15 having the second size, the pixel electrodes of the two lines are disposed in each of the 1-2 touch driving electrode patterns Tx12 and Tx15 having the second size, and the two gate lines for the pixel electrodes of each line are adjacently formed in parallel with one another between the pixel electrodes of the two lines.

Figure 8A:
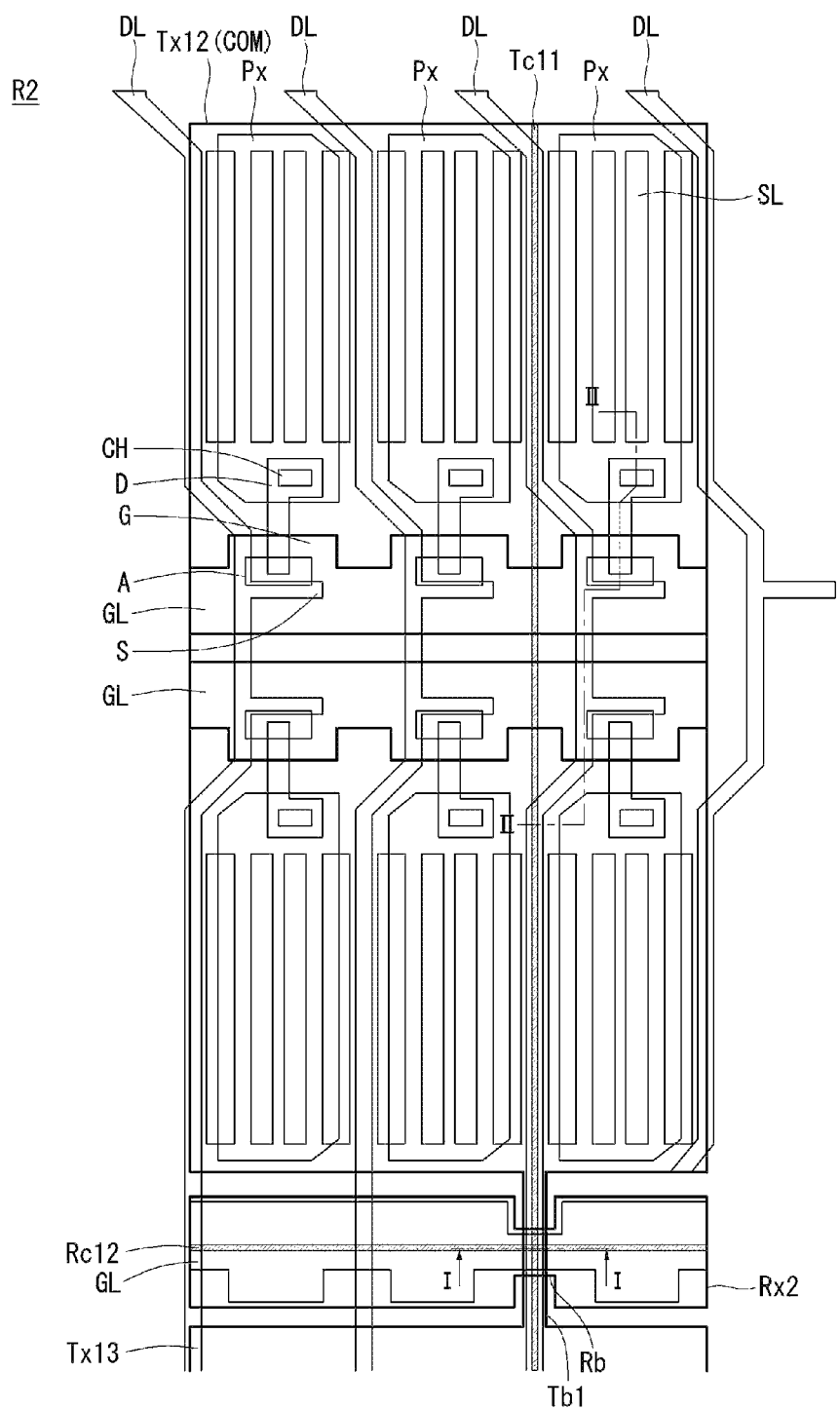
FIG. 8A is a plane view showing an example where a common electrode is formed on a pixel electrode in a region R2 shown in FIG. 7.

Next, the touch sensor integrated type display device according to the second embodiment of the invention, in which the common electrode (the touch driving electrode) is formed on the pixel electrode, is described with reference to FIGS. 8A and 8B. FIG. 8A is a plane view showing an example where the common electrode is formed on the pixel electrode in a region R2 shown in FIG. 7, and FIG. 8B is a cross-sectional view taken along lines IT and II-II' of FIG. 8A.

For the sake of simplicity, the following description will be given focusing on the pixel electrodes Px disposed in the region R2 including a partial area of the 1-2 touch driving electrode pattern Tx12 having the second size and a partial area of one touch sensing electrode Rx2 adjacent to the 1-2 touch driving electrode pattern Tx12. In the embodiment of the invention, 'Px' denotes the subpixels required to represent the color, the three subpixels form one unit pixel electrode, and each subpixel is simply referred to as the pixel electrode.

Figure 8B:
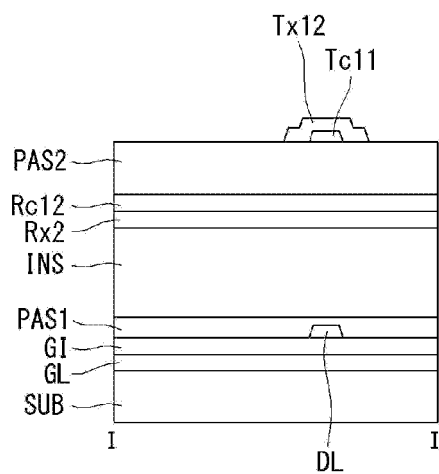
FIG. 8B is a cross-sectional view taken along lines I-I' and II-II' of FIG. 8A.
Figure 8B:
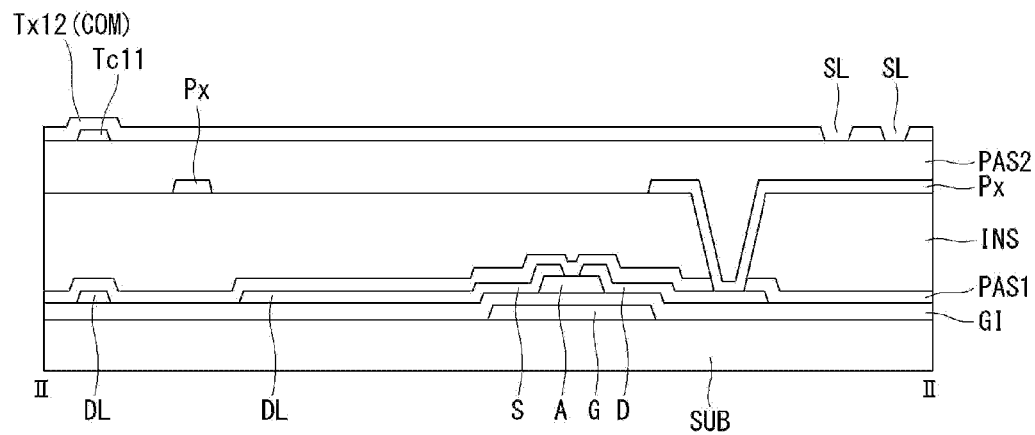

As shown in FIGS. 7, 8A, and 8B, the touch sensor integrated type display device according to the second embodiment of the invention includes gate lines GL and data lines DL formed to cross over each other on a substrate SUB1 of a thin film transistor array TFTA, thin film transistors TFT formed at crossings of the gate lines GL and the data lines DL, pixel electrodes Px formed in areas defined by the crossing of the gate lines GL and the data lines DL, and common electrodes COM positioned opposite the pixel electrodes Px.

In the second embodiment of the invention, the common electrodes COM serve as touch driving electrodes Tx. Thus, the common electrode COM is hereinafter referred to as the touch driving electrode Tx, the touch driving electrode Tx serving as the common electrode, or the common electrode COM serving as the touch driving electrode, if necessary or desired.

In the above configuration of the display device, the gate line GL is formed on the substrate SUB1, and a gate insulating layer GI is formed on the gate line GL. An active layer A, a source electrode S, and a drain electrode D constituting the thin film transistor TFT are formed on the gate insulating layer GI.

Namely, the thin film transistor TFT includes a gate electrode G extending from the gate line GL formed on the substrate SUB1, the active layer A formed in an area corresponding to the gate electrode G on the gate insulating layer GI covering the gate line GL and the gate electrode G, and the source electrode S and the drain electrode D which are separated from each other on the gate insulating layer GI and extend from the data line DL, so as to expose a portion of the active layer A.

The embodiment of the invention has described as an example a thin film transistor having a gate bottom structure, in which the gate electrode is formed under the source and drain electrodes, but is not limited to this example. The embodiment of the invention should be understood that a thin film transistor having a gate top structure, in which the gate electrode is formed on the source and drain electrodes, is available. Since the thin film transistor having the gate top structure is well known, a detailed description thereof will be omitted.

A first passivation layer PAS1 covering the thin film transistor TFT and the data line DL is formed on the gate insulating layer GI, on which the thin film transistor TFT and the data line DL are formed, and an organic insulating layer INS, such as photoacryl, for planarization is formed on the first passivation layer PAS1. A contact hole CH exposing a portion of the drain electrode D is formed on the organic insulating layer INS and the first passivation layer PAS1.

The pixel electrodes Px are formed on the organic insulating layer INS and are respectively arranged in pixel areas defined by the crossing of the data lines DL and the gate lines GL. The pixel electrode Px is formed so that it contacts the drain electrode D of the thin film transistor TFT through the contact hole CH passing through the organic insulating layer INS and the first passivation layer PAS1.

As shown in FIG. 8A, the touch sensing electrode Rx2 is formed on the organic insulating layer INS in parallel with the gate line GL and is positioned between the 1-2 touch driving electrode pattern Tx12 having the second size and the 1-1 touch driving electrode pattern Tx13 having the first size. The touch sensing electrode Rx2 includes a bottleneck Rb having a narrow width at a crossing of the bottleneck Tb1 of the touch driving electrode and the touch sensing electrode Rx2. The touch sensing electrode resistance reducing wire Rc12 is formed on the touch sensing electrode Rx2 in parallel with the gate line GL. The touch sensing electrode Rx2 and the touch sensing electrode resistance reducing wire Rc12 may overlap the gate line GL. In this instance, a reduction in an aperture ratio may be prevented by the touch sensing electrode resistance reducing wire Rc12.

A second passivation layer PAS2 is formed on the organic insulating layer INS, on which the pixel electrodes Px, the touch sensing electrode Rx2, and the touch sensing electrode resistance reducing wire Rc12 are formed.

The touch driving electrode resistance reducing wire Tc11 is formed on the second passivation layer PAS2 and overlaps the data line DL. The touch driving electrode resistance reducing wire Tc11 is formed so that it passes through the bottleneck Rb of the touch sensing electrode.

The 1-1 and 1-2 touch driving electrode patterns Tx13 and Tx12 serving as the common electrode are formed on the second passivation layer PAS2, on which the touch driving electrode resistance reducing wire Tc11 is formed, and are connected through the bottleneck Tb1. The 1-1 and 1-2 touch driving electrode patterns Tx13 and Tx12 cover the touch driving electrode resistance reducing wire Tc11. At least a portion of each of the 1-1 and 1-2 touch driving electrode patterns Tx13 and Tx12 overlaps the pixel electrode Px. Each of the 1-1 and 1-2 touch driving electrode patterns Tx13 and Tx12 includes a plurality of slits SL, so that a horizontal electric field is easily formed between the pixel electrode Px and the touch driving electrode pattern. Thus, the pixel electrodes Px formed on the organic insulating layer INS do not have the slit, and the 1-1 and 1-2 touch driving electrode patterns Tx13 and Tx12 formed on the second passivation layer PAS2 each have the slits.

Figure 9A:
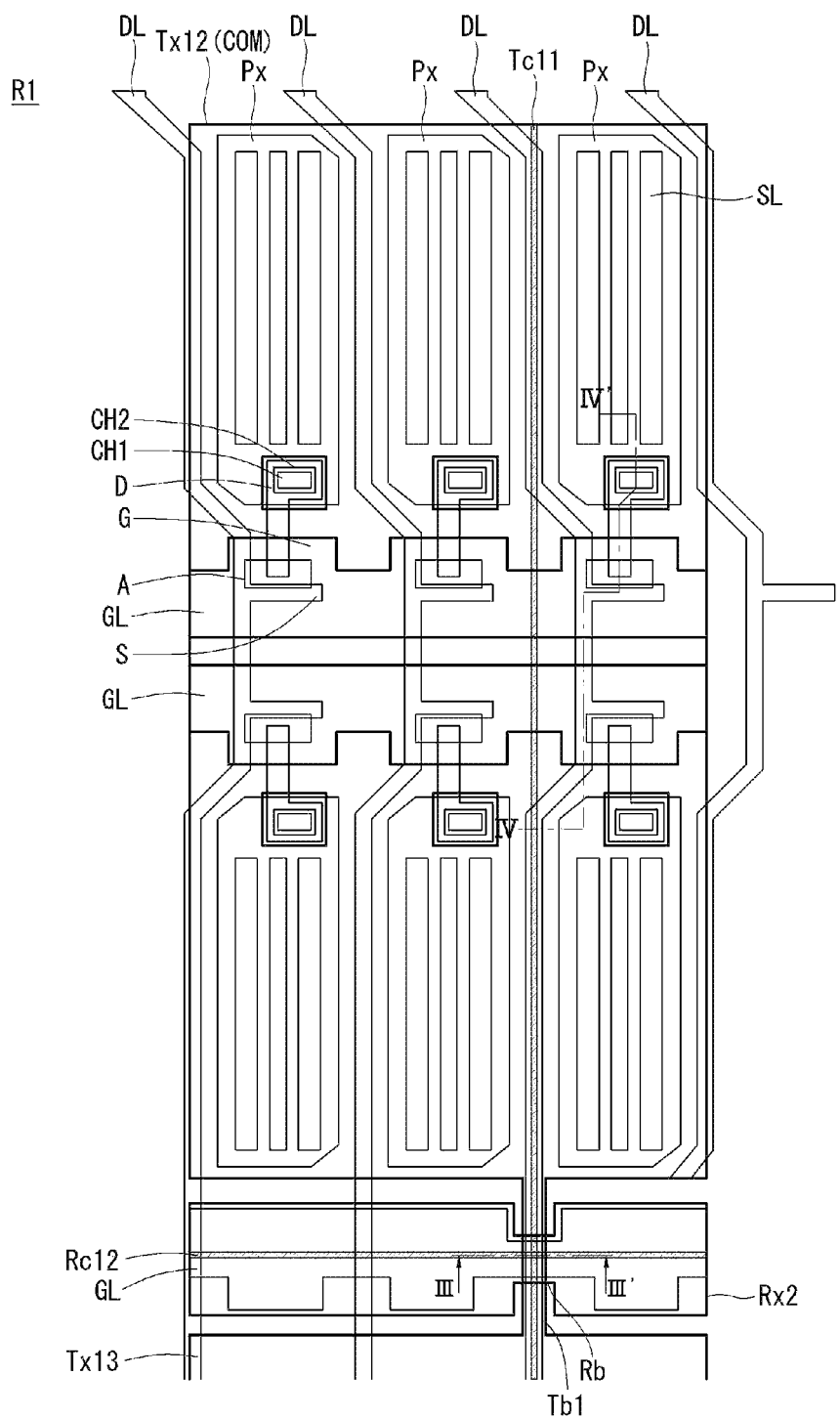
FIG. 9A is a plane view showing an example where a pixel electrode is formed on a common electrode in a region R2 shown in FIG. 7.

Next, the touch sensor integrated type display device according to a modification of the second embodiment of the invention, in which the pixel electrode is formed on the common electrode (the touch driving electrode), is described with reference to FIGS. 9A and 9B. FIG. 9A is a plane view showing an example where the pixel electrode is formed on the common electrode in a region R2 shown in FIG. 7, and FIG. 9B is a cross-sectional view taken along lines III-III' and IV-IV' of FIG. 9A.

Figure 9B:
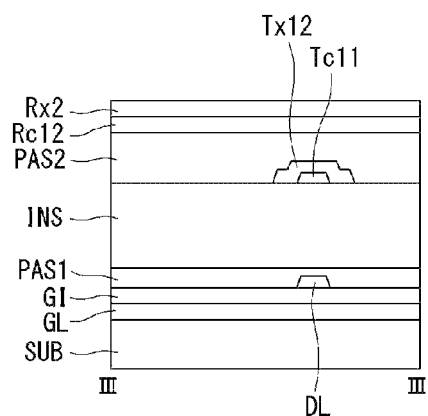
FIG. 9B is a cross-sectional view taken along lines III-III' and IV-IV' of FIG. 9A.
Figure 9B:
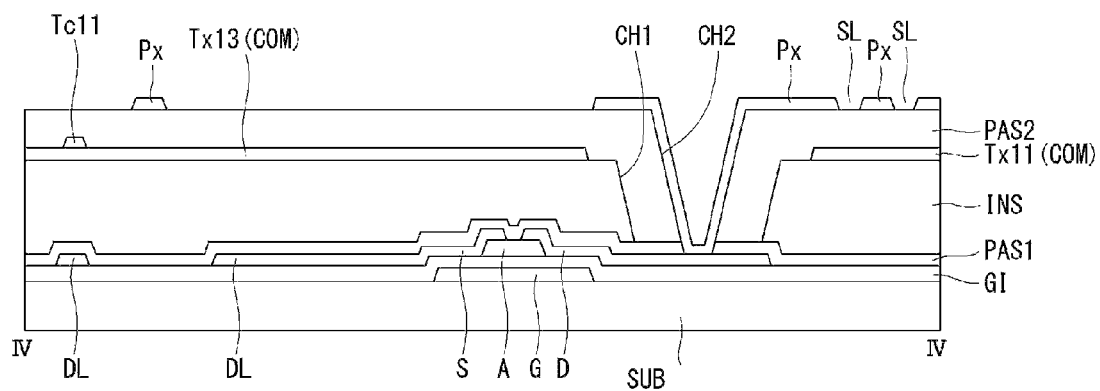

As shown in FIGS. 7, 9A, and 9B, the touch sensor integrated type display device according to the modification of the second embodiment of the invention includes gate lines GL and data lines DL formed to cross over each other on a substrate SUB1 of a thin film transistor array TFTA, thin film transistors TFT formed at crossings of the gate lines GL and the data lines DL, pixel electrodes Px formed in areas defined by the crossing of the gate lines GL and the data lines DL, and common electrodes COM positioned opposite the pixel electrodes Px. In the modification of the second embodiment of the invention, the common electrodes COM serves as touch driving electrodes Tx in the same manner as the second embodiment of the invention. Thus, the common electrode COM is hereinafter referred to as the touch driving electrode Tx, the touch driving electrode Tx serving as the common electrode, or the common electrode COM serving as the touch driving electrode, if necessary or desired.

In the above configuration of the display device, the gate line GL is formed on the substrate SUB1, and a gate insulating layer GI is formed on the gate line GL. An active layer A, a source electrode S, and a drain electrode D constituting the thin film transistor TFT are formed on the gate insulating layer GI.

Namely, the thin film transistor TFT includes a gate electrode G extending from the gate line GL formed on the substrate SUB1, the active layer A formed in an area corresponding to the gate electrode G on the gate insulating layer GI covering the gate line GL and the gate electrode G, and the source electrode S and the drain electrode D which are separated from each other on the gate insulating layer GI and extend from the data line DL, so as to expose a portion of the active layer A.

The embodiment of the invention has described as an example a thin film transistor having a gate bottom structure, in which the gate electrode is formed under the source and drain electrodes, but is not limited to this example. The embodiment of the invention should be understood that a thin film transistor having a gate top structure, in which the gate electrode is formed on the source and drain electrodes, is available. Since the thin film transistor having the gate top structure is well known, a detailed description thereof will be omitted.

A first passivation layer PAS1 covering the thin film transistor TFT and the data line DL is formed on the gate insulating layer GI, on which the thin film transistor TFT and the data line DL are formed, and an organic insulating layer INS, such as photoacryl, for planarization is formed on the first passivation layer PAS1. A first contact hole CH1 is formed in the organic insulating layer INS and exposes the first passivation layer PAS1 of a position corresponding to a portion of the drain electrode D.

1-1 and 1-2 touch driving electrode patterns Tx13 and Tx12 serving as the common electrode, which are connected to each other through a first bottleneck Tb1, are formed on the organic insulating layer INS, in which the first contact hole CH1 is formed. A touch driving electrode resistance reducing wire Tc11 is formed on the 1-1 and 1-2 touch driving electrode patterns Tx13 and Tx12, so that it passes through the first bottleneck Tb1 of the touch driving electrode along the data line DL. When the touch driving electrode resistance reducing wire Tc11 overlaps the data line DL, a reduction in an aperture ratio may be prevented.

A second passivation layer PAS2 is formed on the organic insulating layer INS, on which the 1-1 and 1-2 touch driving electrode patterns Tx13 and Tx12 and the touch driving electrode resistance reducing wire Tc11 are formed. A second contact hole CH2 is formed in the first passivation layer PAS1 exposed through the first contact hole CH1 of the organic insulating layer INS and the second passivation layer PAS2 and exposes a portion of the drain electrode D of the thin film transistor TFT.

A touch sensing electrode resistance reducing wire Rc12 is formed on the second passivation layer PAS2, in which the second contact hole CH2 is formed, and is positioned between the 1-1 and 1-2 touch driving electrode patterns Tx13 and Tx12 in a direction (i.e., the x-axis direction) parallel to the gate line GL. Pixel electrodes Px are formed on the second passivation layer PAS2, on which the touch sensing electrode resistance reducing wire Rc12 is formed, and are respectively positioned in pixel areas defined by the crossing of the data lines DL and the gate lines GL. A touch sensing electrode Rx2 is formed between the 1-1 and 1-2 touch driving electrode patterns Tx13 and Tx12, which are adjacent to each other in the y-axis direction, in parallel with the gate line GL, so as to cover the touch sensing electrode resistance reducing wire Rc12. Namely, the touch sensing electrode Rx2 is disposed in a space between the 1-2 touch driving electrode pattern Tx12 and the 1-1 touch driving electrode pattern Tx13. The touch sensing electrode Rx2 includes a bottleneck Rb at a crossing of the touch sensing electrode Rx2 and the bottleneck Tb1 connecting the adjacent 1-1 and 1-2 touch driving electrode patterns Tx13 and Tx12.

The pixel electrodes Px overlap the 1-1 and 1-2 touch driving electrode patterns Tx13 and Tx12. Each pixel electrode Px includes a plurality of slits SL, so that a horizontal electric field is easily formed between the pixel electrodes Px and the 1-1 and 1-2 touch driving electrode patterns Tx13 and Tx12. Thus, the 1-1 and 1-2 touch driving electrode patterns Tx13 and Tx12 formed on the organic insulating layer INS do not have the slit, and the pixel electrodes Px formed on the second passivation layer PAS2 each have the slits.

The touch sensor integrated type display device according to the second embodiment of the invention and the modification of the second embodiment may obtain the following effects, compared with the touch sensor integrated type display device according to the first embodiment of the invention and the modification of the first embodiment.

In the touch sensor integrated type display device according to the first embodiment of the invention, each touch driving electrode pattern is disposed correspondingly to the plurality of unit pixel electrodes of one line, and the mutual capacitance increases due to the touch sensing electrode and the touch driving electrode pattern formed based on the unit pixel electrode. Hence, an increase in the mutual capacitance affects the touch sensitivity of the display device. Further, the touch sensitivity of the display device may be reduced by the parasitic capacitance generated between the touch sensing electrode and the touch driving electrode resistance reducing wires and the signal wires of the display device.

On the other hand, in the touch sensor integrated type display device according to the second embodiment of the invention and the modification of the second embodiment, the touch driving electrode includes the 1-1 touch driving electrode pattern corresponding to the pixel electrodes of one line and the 1-2 touch driving electrode pattern corresponding to the pixel electrodes of two lines, the touch sensing electrode is disposed between the 1-1 touch driving electrode and the 1-2 touch driving electrode, and the gate lines are disposed between the two lines of the pixel electrodes disposed correspondingly to the 1-2 touch driving electrode pattern. Hence, the number of touch sensing electrodes overlapping the gate lines may decrease. Thus, in addition to the effect capable of being obtaining by the touch sensor integrated type display device according to the first embodiment of the invention, the mutual capacitance and the parasitic capacitance may be reduced by a reduction in the number of touch sensing electrodes. Hence, the touch sensitivity of the display device may be improved.

In the touch sensor integrated type display device according to the embodiments of the invention, because the wires, which connect the touch driving electrodes with the touch sensing electrodes and reduce their resistances, may be formed to overlap the data lines or the gate lines, a reduction in the aperture ratio may be prevented. At the same time, a relationship between the touch driving electrodes, the touch sensing electrodes, and the wires, which constitute the touch sensors, can be easily designed based on the design of the pixel electrodes, the gate lines, and the data lines of the display device.

Further, because the contact hole for connecting the touch driving electrode with the touch sensing electrode resistance reducing wires is not required in the embodiments of the invention, the aperture ratio of the display device may increase. Hence, the embodiments of the invention can be advantageous to the large-sized products with a high resolution.

Further, in the touch sensor integrated type display device according to the embodiments of the invention, the touch driving electrode includes the 1-1 touch driving electrode pattern corresponding to the pixel electrodes of one line and the 1-2 touch driving electrode pattern corresponding to the pixel electrodes of two lines, the touch sensing electrode is disposed between the 1-1 touch driving electrode and the 1-2 touch driving electrode, and the gate lines are disposed between the two lines of the pixel electrodes disposed correspondingly to the 1-2 touch driving electrode pattern. Hence, the number of touch sensing electrodes overlapping the gate lines may decrease. Thus, the mutual capacitance and the parasitic capacitance may be reduced by a reduction in the number of touch sensing electrodes. Hence, the touch sensitivity of the display device may be improved.

Although embodiments have been described with reference to a number of illustrative embodiments thereof, it should be understood that numerous other modifications and embodiments can be devised by those skilled in the art that will fall within the scope of the principles of this disclosure. For example, in the embodiments of the invention, the touch driving electrode may be used as the touch sensing electrode, and the touch sensing electrode may be used as the touch driving electrode. Further, in the embodiments of the invention, the first passivation layer for protecting the thin film transistor and the organic insulating layer for the planarization are individually formed. However, one of the first passivation layer and the organic insulating layer may perform the two functions of the protection and the planarization.

It will be apparent to those skilled in the art that various modifications and variations can be made in the touch sensor integrated type display device of the present invention without departing from the spirit or scope of the invention. Thus, it is intended that the present invention cover the modifications and variations of this invention provided they come within the scope of the appended claims and their equivalents.

What is claimed is:

1. A touch sensor integrated type display device, comprising:
 a plurality of gate lines and a plurality of data lines crossing over the gate lines;
 a plurality of pixel electrodes respectively disposed in areas defined by the crossing of the gate lines and the data lines;
 a plurality of 1-1 electrodes, each of which is disposed correspondingly to a first subset of the plurality of pixel electrodes and has a first size;
 a plurality of 1-2 electrodes connected to the plurality of 1-1 electrodes, each of which is disposed correspondingly to a second subset of the plurality of pixel electrodes, and has a second size greater than the first size to increase aperture ratio and improve display quality; and
 a plurality of second electrodes, each of which is disposed between the 1-1 electrode and the 1-2 electrode,
 wherein two adjacent 1-1 electrodes are disposed between the 1-2 electrodes in parallel.

2. The touch sensor integrated type display device of claim 1, wherein the plurality of 1-1 and 1-2 electrodes serve as both a common electrode and a touch driving electrode, and the plurality of second electrodes are touch sensing electrodes.

3. The touch sensor integrated type display device of claim 1, wherein the plurality of 1-1 and 1-2 electrodes serve as both a common electrode and a touch sensing electrode, and the plurality of second electrodes are touch driving electrodes.

4. The touch sensor integrated type display device of claim 1, wherein the pixel electrodes disposed in pixel areas corresponding to the 1-1 electrode constitute one line, and the pixel electrodes disposed in pixel areas corresponding to the 1-2 electrode constitute two lines.

5. The touch sensor integrated type display device of claim 4, wherein two gate lines for the pixel electrodes of the two lines are adjacently disposed in parallel between the two lines of the pixel electrodes arranged correspondingly to the 1-2 electrode.

6. The touch sensor integrated type display device of claim 1, further comprising at least one first electrode resistance reducing wire which contacts each of the plurality of 1-1 and 1-2 electrodes, is disposed along a direction of the data line, and reduces resistances of the plurality of 1-1 and 1-2 electrodes.

7. The touch sensor integrated type display device of claim 6, wherein the first electrode resistance reducing wire is disposed to overlap the data line.

8. The touch sensor integrated type display device of claim 6, further comprising at least one second electrode resistance reducing wire which is disposed on each of the plurality of second electrodes along a direction of the second electrode to overlap the second electrode and reduces resistances of the second electrodes.

9. The touch sensor integrated type display device of claim 8, wherein the second electrode resistance reducing wire is disposed to overlap the gate line.

10. The touch sensor integrated type display device of claim 6, wherein the 1-1 electrode and the 1-2 electrode are connected through at least one first bottleneck, and the first electrode resistance reducing wire passes through the at least one first bottleneck, the 1-1 and 1-2 electrodes.

11. The touch sensor integrated type display device of claim 10, wherein the second electrode includes a second bottleneck having a width less than that of the second electrode at a crossing of the first bottleneck and the second electrode.

12. The touch sensor integrated type display device of claim 1, wherein the pixel electrodes are disposed on a first passivation layer covering thin film transistors disposed at crossings of the data lines and the gate lines and are connected to the thin film transistors exposed through a contact hole passing through the first passivation layer,
 wherein the 1-1 and 1-2 electrodes are disposed on a second passivation layer covering the pixel electrodes, and at least a portion of each of the 1-1 and 1-2 electrodes overlaps the pixel electrodes.

13. The touch sensor integrated type display device of claim 1, wherein the 1-1 and 1-2 electrodes are disposed on a first passivation layer covering thin film transistors disposed at crossings of the data lines and the gate lines,
 wherein the pixel electrodes are disposed on a second passivation layer covering the 1-1 and 1-2 electrodes, and at least a portion of each of the 1-1 and 1-2 electrodes overlaps the pixel electrodes,
 wherein each pixel electrode is connected to the thin film transistor exposed through a contact hole passing through the first and second passivation layers.

* * * * *